US009733482B2

(12) United States Patent
West et al.

(10) Patent No.: US 9,733,482 B2
(45) Date of Patent: Aug. 15, 2017

(54) WEARABLE ELECTRONIC DISPLAY WITH PIVOTING DISPLAY

(71) Applicant: Kopin Corporation, Westborough, MA (US)

(72) Inventors: Adrian Mark Thomas West, Newton, MA (US); Zachary Jarrod Traina, Hingham, MA (US); Junggeun Tak, Newton Upper Falls, MA (US); Thomas Gerard Parent, Cambridge, MA (US)

(73) Assignee: Kopin Corporation, Westborough, MA (US)

( * ) Notice: Subject to any disclaimer, the term of this patent is extended or adjusted under 35 U.S.C. 154(b) by 0 days.

(21) Appl. No.: 14/149,261

(22) Filed: Jan. 7, 2014

(65) Prior Publication Data

US 2014/0176398 A1 Jun. 26, 2014

Related U.S. Application Data

(63) Continuation of application No. 13/092,485, filed on Apr. 22, 2011, now Pat. No. 8,643,568.
(Continued)

(51) Int. Cl.
*G02B 27/01* (2006.01)

(52) U.S. Cl.
CPC ..... *G02B 27/0179* (2013.01); *G02B 27/0176* (2013.01); *G02B 2027/0158* (2013.01);
(Continued)

(58) Field of Classification Search
CPC ........ G02B 2027/01; G02B 2027/0181; G02B 2027/0185; G02B 2027/0158;
(Continued)

(56) References Cited

U.S. PATENT DOCUMENTS

D202,380 S 9/1965 Rabb
5,003,300 A 3/1991 Wells
(Continued)

FOREIGN PATENT DOCUMENTS

CN 201247347 5/2009
JP 58113913 A 7/1983
(Continued)

OTHER PUBLICATIONS

Notification of Transmittal of The International Search Report and the Written Opinion of the International Searching Authority for PCT/US2011/033516 mailed on Jul. 12, 2011.
(Continued)

*Primary Examiner* — Temesghen Ghebretinsae
*Assistant Examiner* — Lisa Landis
(74) *Attorney, Agent, or Firm* — Hamilton, Brook, Smith & Reynolds, P.C.

(57) ABSTRACT

A wearable display apparatus includes a display for providing viewable images. A display support assembly can support the display. The display support assembly can be self centering and telescoping for adjusting the position of the display for viewing by a user. The display support assembly can include right side and left side arm members spaced apart from each other, and a flexibly resilient support member to which the display is mounted between the arm members. The support member can be telescopically mounted to the arm members. The support member can have flexibly resilient right and left side portions secured to the display. Each side portion can be slidably mounted to a respective arm member for telescoping. The support member can have a material cross section that provides stiffness for supporting the display when in a generally horizontal orientation for viewing while also providing resilient flexibility between the arm members to self center the display
(Continued)

between the arm members with changes in distances between the arm members.

24 Claims, 14 Drawing Sheets

Related U.S. Application Data

(60) Provisional application No. 61/328,264, filed on Apr. 27, 2010.

(52) U.S. Cl.
CPC ............... *G02B 2027/0161* (2013.01); *G02B 2027/0181* (2013.01); *G02B 2027/0185* (2013.01); *Y10T 29/49826* (2015.01)

(58) Field of Classification Search
CPC ............ G02B 2027/0161; G02B 27/01; G02B 27/017; G02B 27/0101–27/0189
USPC .......................................... 345/7–9
See application file for complete search history.

(56) References Cited

U.S. PATENT DOCUMENTS

| | | | |
|---|---|---|---|
| 5,162,828 A | 11/1992 | Furness et al. | |
| D383,455 S | 9/1997 | MacInnes et al. | |
| 5,815,126 A | 9/1998 | Fan et al. | |
| D402,651 S | 12/1998 | Depay et al. | |
| 5,903,395 A | 5/1999 | Rallison et al. | |
| D433,023 S | 10/2000 | Pinchuk | |
| D433,411 S | 11/2000 | Kawashima | |
| D443,864 S | 6/2001 | Obata | |
| 6,351,252 B1 | 2/2002 | Atsumi et al. | |
| 6,369,952 B1* | 4/2002 | Rallison | G02B 27/017 359/630 |
| 6,400,341 B1 | 6/2002 | Maeda et al. | |
| 6,421,031 B1 | 7/2002 | Ronzani et al. | |
| 6,424,321 B1 | 7/2002 | Ronzani et al. | |
| 6,449,309 B1 | 9/2002 | Tabata | |
| 6,480,174 B1 | 11/2002 | Kaufmann et al. | |
| 6,727,894 B1 | 4/2004 | Karidis et al. | |
| 6,747,611 B1 | 6/2004 | Budd et al. | |
| 6,762,885 B1 | 7/2004 | Ogasawara et al. | |
| 6,914,583 B1 | 7/2005 | Chigira | |
| 6,978,478 B2* | 12/2005 | Urakawa | G02B 27/0176 2/15 |
| 7,190,330 B2 | 3/2007 | Travers et al. | |
| D566,744 S | 4/2008 | Travers et al. | |
| D578,120 S | 10/2008 | Lowe et al. | |
| D579,014 S | 10/2008 | Travers et al. | |
| 7,474,276 B2 | 1/2009 | Endo et al. | |
| 7,527,374 B2 | 5/2009 | Chon | |
| 7,542,012 B2 | 6/2009 | Kato et al. | |
| D602,064 S | 10/2009 | Mitsui et al. | |
| 7,740,353 B2 | 6/2010 | Jannard | |
| 7,753,520 B2 | 7/2010 | Fuziak, Jr. | |
| D624,111 S | 9/2010 | Knoop | |
| D638,462 S | 5/2011 | Bumgardner | |
| D669,471 S | 10/2012 | Hwang et al. | |
| 8,545,013 B2 | 10/2013 | Hwang et al. | |
| 8,643,568 B2 | 2/2014 | West et al. | |
| D704,704 S | 5/2014 | Tatara et al. | |
| D716,364 S | 10/2014 | Chow et al. | |
| D736,771 S | 8/2015 | West et al. | |
| 2002/0171605 A1 | 11/2002 | Kim et al. | |
| 2004/0113867 A1* | 6/2004 | Tomine | G02B 27/0172 345/8 |
| 2005/0047850 A1 | 3/2005 | Wright et al. | |
| 2005/0146487 A1 | 7/2005 | Travers et al. | |
| 2005/0221721 A1 | 10/2005 | Valle et al. | |
| 2006/0132382 A1 | 6/2006 | Jannard | |
| 2008/0122736 A1* | 5/2008 | Ronzani | G02B 27/017 345/8 |
| 2008/0169998 A1 | 7/2008 | Jacobsen et al. | |
| 2008/0309588 A1 | 12/2008 | Miyake et al. | |
| 2009/0213038 A1 | 8/2009 | Huang et al. | |
| 2009/0295531 A1* | 12/2009 | Silva | H01F 3/10 336/221 |
| 2010/0245757 A1 | 9/2010 | Sugihara et al. | |
| 2010/0253904 A1 | 10/2010 | Jannard | |
| 2010/0309295 A1 | 12/2010 | Chow | |
| 2011/0090135 A1* | 4/2011 | Tricoukes | G02B 27/0176 345/8 |
| 2011/0273365 A1 | 11/2011 | West et al. | |

FOREIGN PATENT DOCUMENTS

| | | |
|---|---|---|
| JP | 2002122129 A | 4/2002 |
| JP | 3143582 | 7/2008 |
| WO | WO 01/17239 A1 | 3/2001 |
| WO | WO 2010/141870 A1 | 12/2010 |
| WO | WP 2011/137034 A1 | 11/2011 |

OTHER PUBLICATIONS

Notification Concerning Transmittal of International Preliminary Report on Patentability for Int'l Application No. PCT/US2011/033516; Date Mailed: Nov. 8, 2012.

* cited by examiner

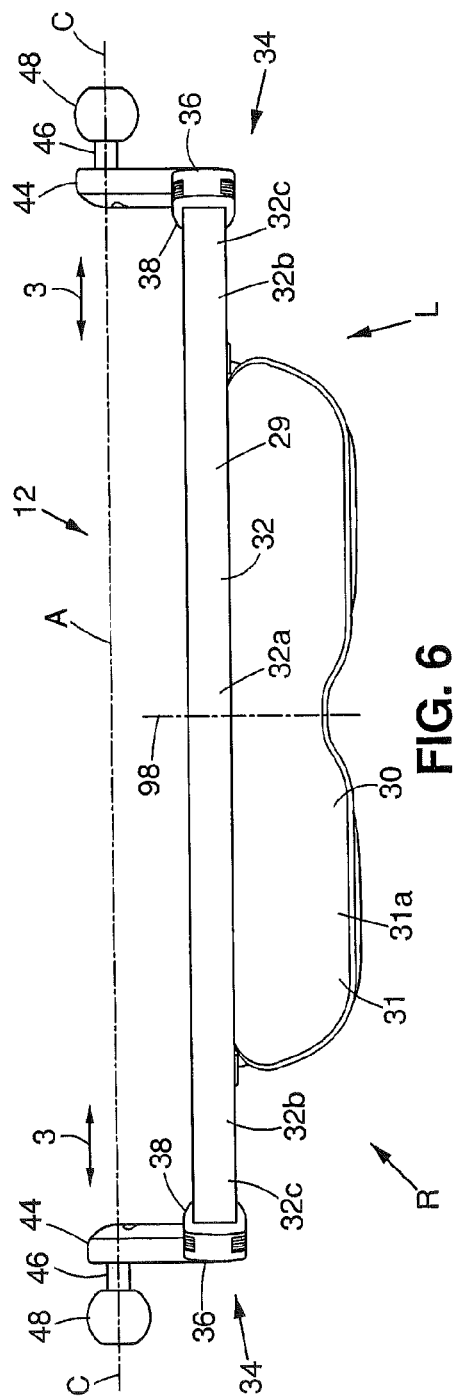
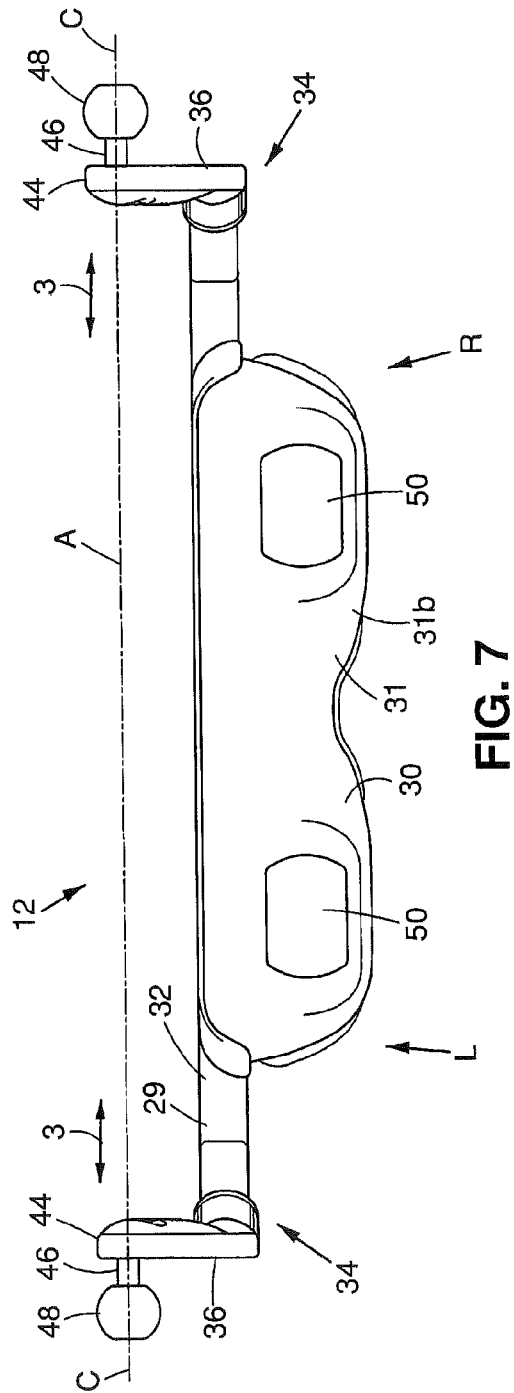
FIG. 6
FIG. 7

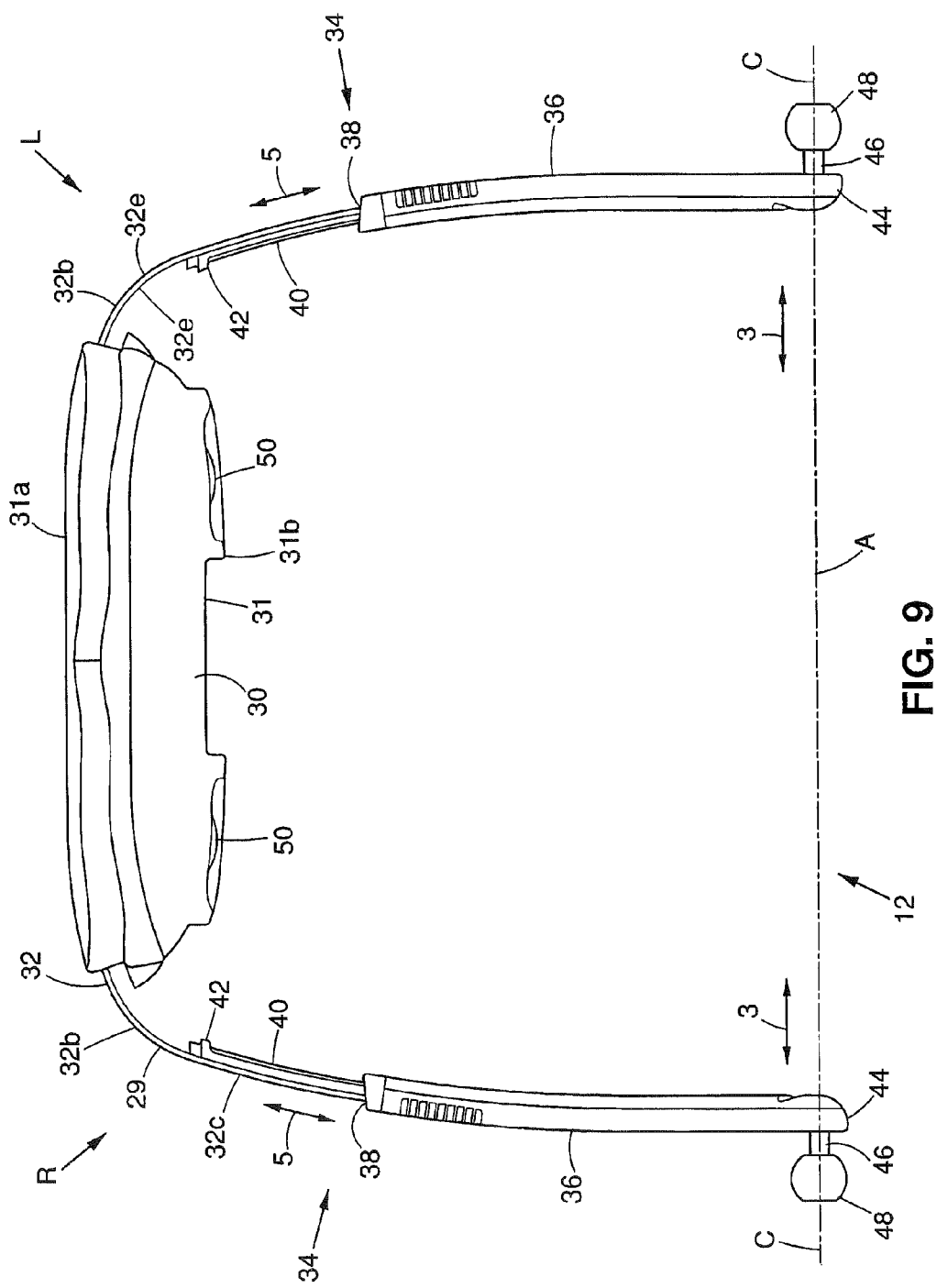

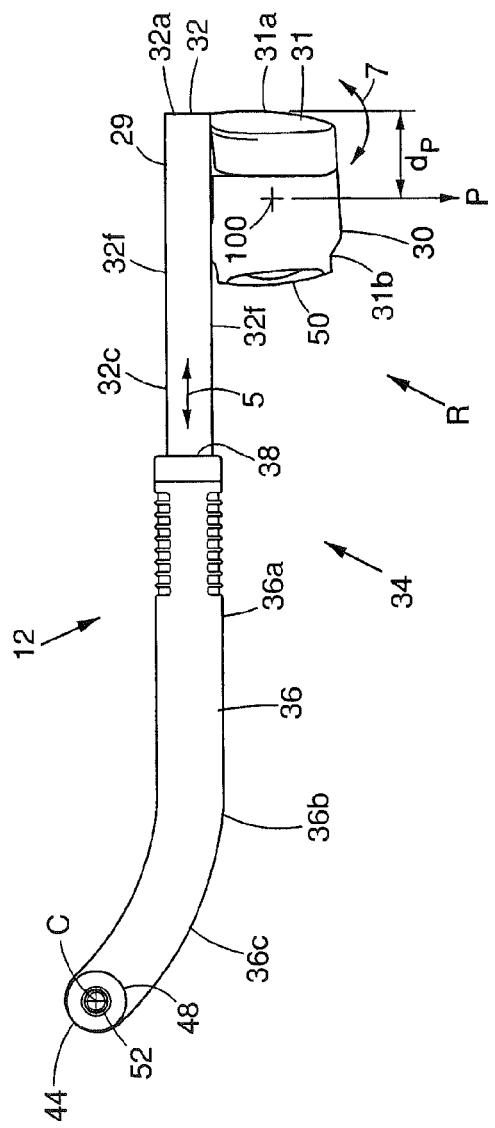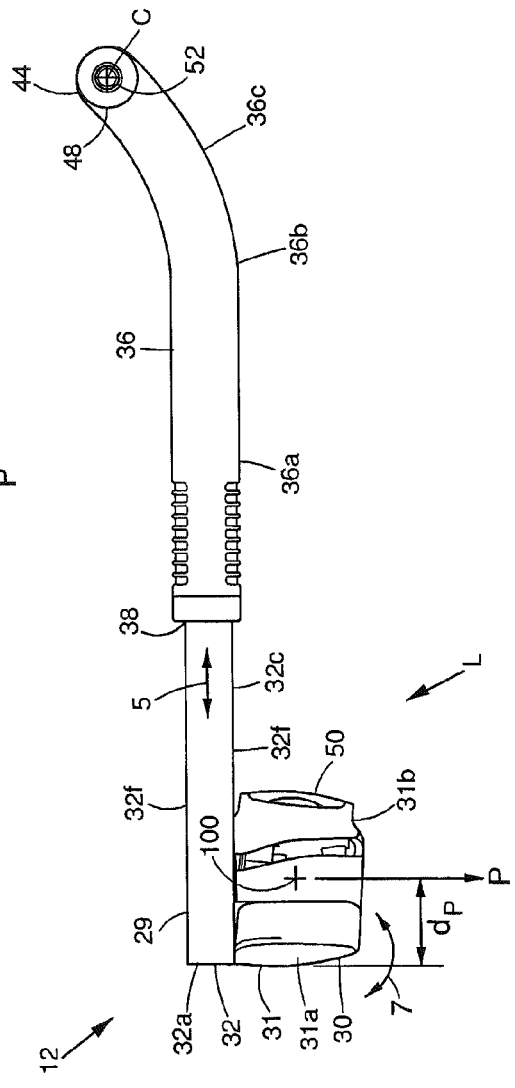

WEARABLE ELECTRONIC DISPLAY WITH PIVOTING DISPLAY

RELATED APPLICATION

This application is a Continuation of U.S. application Ser. No. 13/092,485 filed on Apr. 22, 2011, which claims the benefit of U.S. Provisional Application No. 61/328,264 filed on Apr. 27, 2010. The entire teachings of the above applications are incorporated herein by reference.

BACKGROUND

Video eyewear or wearable electronic displays can be worn on the head of the user to allow the user to view images and listen to sound or audio. The head size of different users can vary, which can affect the quality of viewing by the user unless proper adjustments are made.

SUMMARY

The present invention provides a wearable display apparatus in which the position of the display can be easily adjusted to optimize viewing by the user. The wearable display apparatus can include a display for providing viewable images. A display support assembly can support the display. The display support assembly can be self centering and telescoping for adjusting the position of the display for viewing by a user. The display support assembly can include right side and left side arm members spaced apart from each other, and a flexibly resilient support member to which the display is mounted between the arm members. The support member can be telescopically mounted to the arm members. The support member can have flexibly resilient right and left side portions secured to the display. Each side portion can be slidably mounted to a respective arm member for telescoping. The support member can have a material cross section that provides stiffness for supporting the display when in a generally horizontal orientation for viewing while also providing resilient flexibility between the arm members to self center the display between the arm members with changes in distances between the arm members.

In particular embodiments, the support member can be a unitary flexibly resilient support member. The right and left side portions can be spaced apart from each other and integrally formed with and bent in cantilevered fashion relative to a cross member to which the display is mounted. The unitary support member can be formed of a band of material having a width of sufficient size for providing stiffness for supporting the display when in a generally horizontal orientation for viewing, and a thickness thin enough that allows resilient lateral flexibility. The unitary support member can be a resilient metallic band in which the side portions of the unitary support member are bent relative to the cross member in a radius where the side portions are angled slightly away from each other. Slide members can be mounted to at least a portion of the side portions of the unitary support member, for sliding within a cavity in each arm member. A cable can extend within at least one arm member for providing electrical communication to the display. The cable can be secured to a respective telescoping side portion of the support member within the at least one arm member. The cable can have a pattern or predetermined bendable regions to allow a length of the cable to contract and expand in a predictable manner with telescoping of the side portion. The cable can have a series of generally rigid sections separated from each other with generally flexible sections. At least a portion of the cable can be positioned in the zig zag fashion to allow contraction and expansion of the cable and in an accordion like manner. The cable can include a series of individually insulated Litz wires with a length over which a series of generally rigid insulative sections are formed that are separated from each other by gaps. A head set band configured for being worn by the user can be included, and the arm members of the display support assembly each can be rotatably mounted to the head set band with a three-axis joint to allow pivoting of the display support assembly up and down with varying distances between the arm members. The three-axis joint can be a ball joint. The head set band can include right side and left side earphones. The arm members of the display support assembly can be rotatably mounted on an inner surface of the head set band above each earphone. The arm members each can have an upward bend to provide clearance from the earphones when pivoting up and down. The ball joint can be spring loaded. At least one ball joint can have a passage through which electrical wires can pass through. The display can be mounted to the support member by a pivot joint about a pivot axis. The pivot joint can have a radius surface generally concentric to the pivot axis that contacts a resilient member to provide a frictional brake to hold the display in place once pivoted to a desired position.

The present invention can also provide a wearable display apparatus including a display for providing viewable images. A display support assembly can support the display. The display support assembly can be self centering and telescoping for adjusting the position of the display for viewing by a user. The display support assembly can include right side and left side arm members spaced apart from each other. A flexibly resilient unitary support member can extend between the arm members and can be telescopically mounted to the arm members. The unitary support member can have a cross member to which the display is mounted, and right and left side portions spaced apart from each other that are integrally formed with the cross member and bent in cantilevered fashion relative to the cross member. Each side portion can be slidably mounted to a respective arm member for telescoping. The unitary support member can have a material cross section that provides stiffness for supporting the display when in a generally horizontal orientation for viewing, while also providing resilient flexibility between the arm members to self center the display between the arm members with changes in distances between the arm members.

The present invention also provides a method of supporting a display that provides viewable images in a wearable display apparatus, with a self centering and telescoping display support assembly that can adjust the position of the display for viewing by a user. Right side and left side arm members can be spaced apart from each other. The display can be mounted to a flexibly resilient support member between the arm members. The support member can be telescopically mounted to the arm members. The support member can have flexibly resilient right side and left side portions secured to the display. Each side portion can be slidably mounted to a respective arm member for telescoping. The support member can have a material cross section that provides stiffness for supporting the display when in a generally horizontal orientation for viewing, while also proving resilient flexibility between the arm members to self center the display between the arm members with changes in distances between the arm members.

In particular embodiments, the support member can be a unitary flexibly resilient support member. The right side and left side portions can be spaced apart from each other and integrally formed with and bent in cantilevered fashion relative to a cross member to which the display is mounted. The unitary support member can be configured from a band of material having a width of sufficient size for providing stiffness for supporting the display when in a generally horizontal orientation for viewing, and a thickness thin enough that allows resilient lateral flexibility. The unitary support member can be configured from a resilient metallic band in which the side portions of the unitary support member are bent relative to the cross member in a radius where the side portions are angled slightly away from each other. Slide members can be mounted to at least a portion of the side portions of the unitary support member, for sliding within a cavity in each arm member. A cable can be extended within at least one arm member for providing electrical communication to the display. The cable can be secured to a respective telescoping side portion of the support member within at least one arm member. The cable can have a pattern of predetermined bendable regions to allow a length of the cable to contract and expand in a predictable manner with telescoping of the side portion. The cable can be provided with a series of generally rigid sections separated from each other with generally flexible sections. The at least a portion of the cable can be positioned in a zig zag fashion to allow contraction and expansion of the cable in an accordion like manner. The cable can be provided with a series of individually insulated Litz wires with a length over which a series of generally rigid insulative sections are formed that are separated from each other by gaps. Each arm member of the display support assembly can be rotatably mounted to a head set band with a three-axis joint to allow pivoting of the display support assembly up and down with varying distances between the arm members. The three-axis joint can be configured as a ball joint. The head set band can include right side and left side earphones. The arm members of the display support assembly can be rotatably mounted on an inner surface of the head set band above each earphone. The arm members can each have an upward bend to provide clearance from the earphones when pivoting up and down. The ball joint can be spring loaded. At least one ball joint can have a passage through which electrical wires can pass through. The display can be mounted to the support member by a pivot joint about a pivot axis. The pivot joint can have a radius surface generally concentric to the pivot axis that contacts a resilient member to provide a frictional brake to hold the display in place once pivoted to a desired position.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5A is a cross sectional view of an embodiment of a support member.

FIG. 6 is a front view of the display support assembly of FIG. 5.

FIG. 7 is a rear view of the display support assembly of FIG. 5.

FIG. 9 is a bottom view of the display support assembly of FIG. 5.

FIG. 10 is a right side view of the display support assembly of FIG. 5.

FIG. 11 is a left side view of the display support assembly of FIG. 5.

DETAILED DESCRIPTION

A description of example embodiments of the invention follows.

Figure 1:
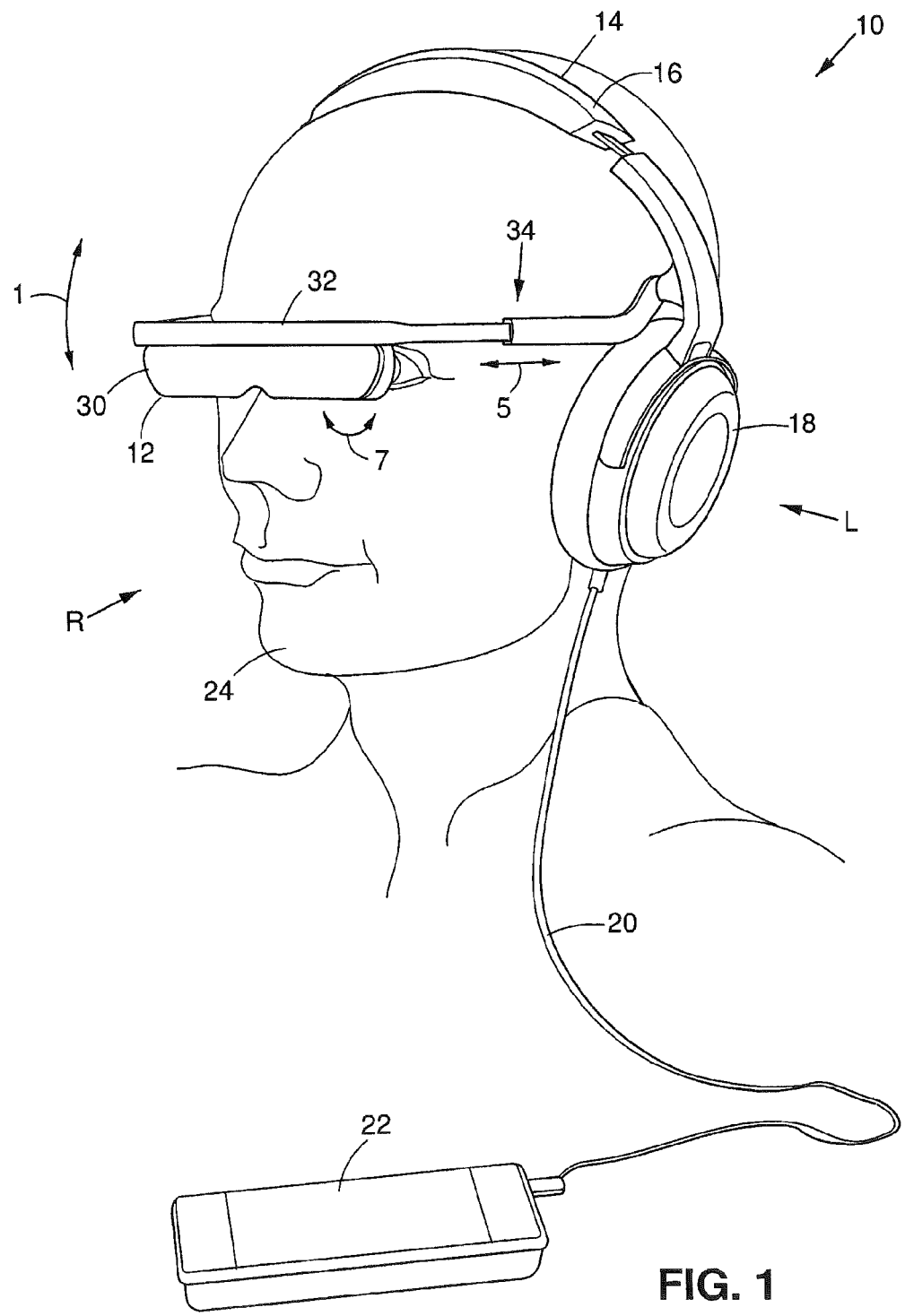
FIG. 1 is a perspective view of a user wearing an embodiment of a wearable display apparatus in the present invention.
Figure 2:
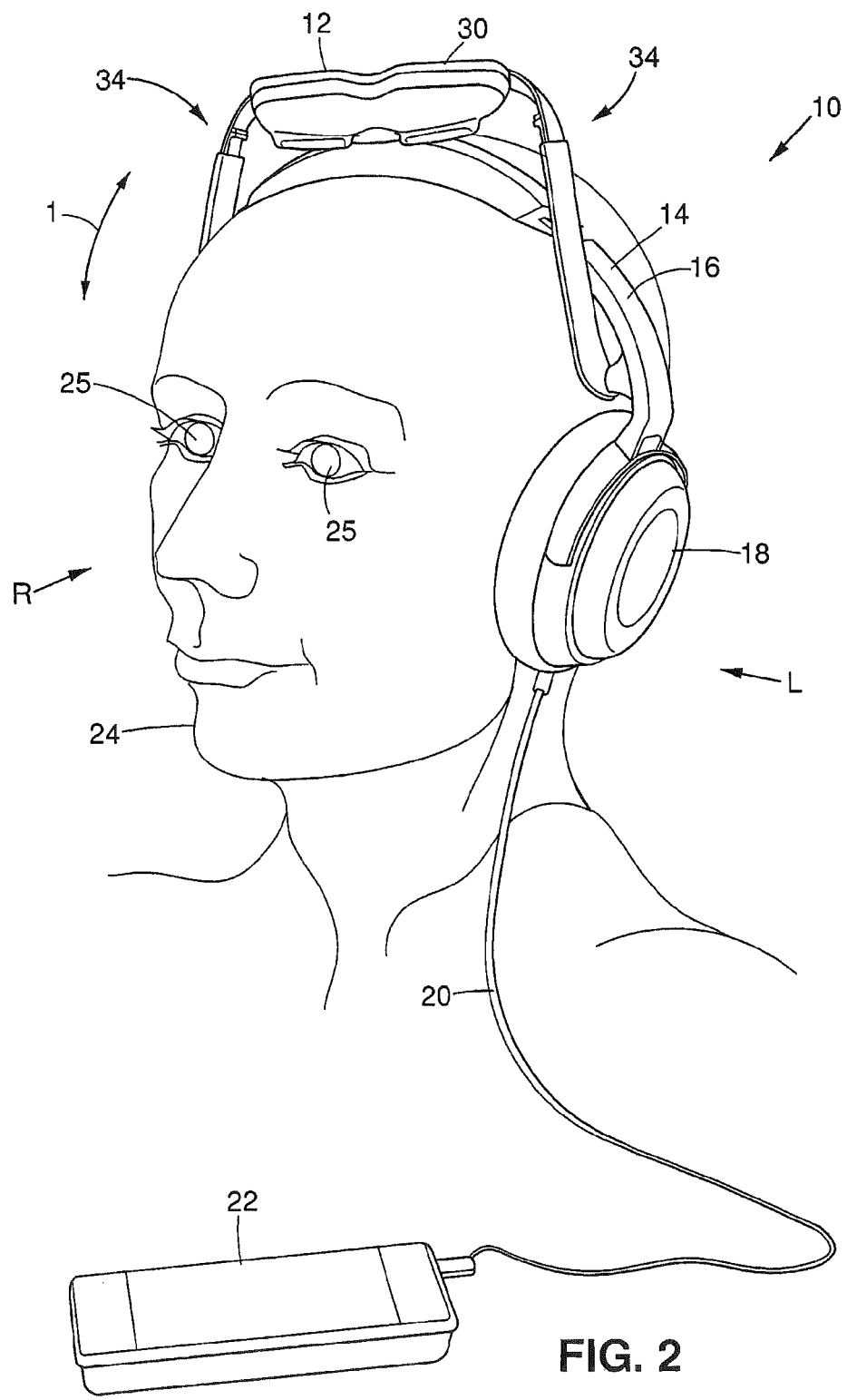
FIG. 2 is a perspective view in which the display of the wearable display apparatus of FIG. 1 is pivoted into a raised position.

Referring to FIGS. 1 and 2, in one embodiment, wearable electronic display device or apparatus 10 can be worn by a user 24 on the head for viewing images, which can include video and computer images, and listening to sound or audio. The display apparatus 10 can have a head set 14 having a support or head band 16 that extends over or across the top of the head, with speakers or earphones 18 on a first or right side R and a second or left side L. The earphones 18 can be worn over the user's 24 ears to listen to sound or audio. An adjustable or telescoping display support assembly 12 having an electronic image display 30 mounted in cantilevered fashion between two spaced apart telescoping arms 34, can be pivotably mounted about a pivot or rotational axis A (FIG. 3) to the head band 16 of the head set 14. The display can be mounted to a support member 32 between the arms 34. As a result, the display 30 can be moved in and out, or forward and backward, in the direction of arrows 5, as well as up and down in the direction of arrows 1. The display 30 can be moved upwardly into a raised position when not in use, or downwardly into a lowered generally horizontal position in front of the eyes for viewing. The display 30 can be an electronic binocular display device as known in the art, with viewing optics 50 (FIG. 4) on the right side R and left side L for providing binocular viewing of images. The audio and images can be provided to the display apparatus 10 by a source or device 22, which can be through a cable or line 20 connected to and between the source 22 and head set 14. The cable 20 can be connected to the head set 14, such as to an earphone 18. The source 22 can be any suitable source, including a computer, a video or disc player, cable link, an interactive telephone, etc. In some embodiments, the display apparatus 10 can have an antenna for receiving wireless communications from source 22 or other suitable devices.

Figure 3:
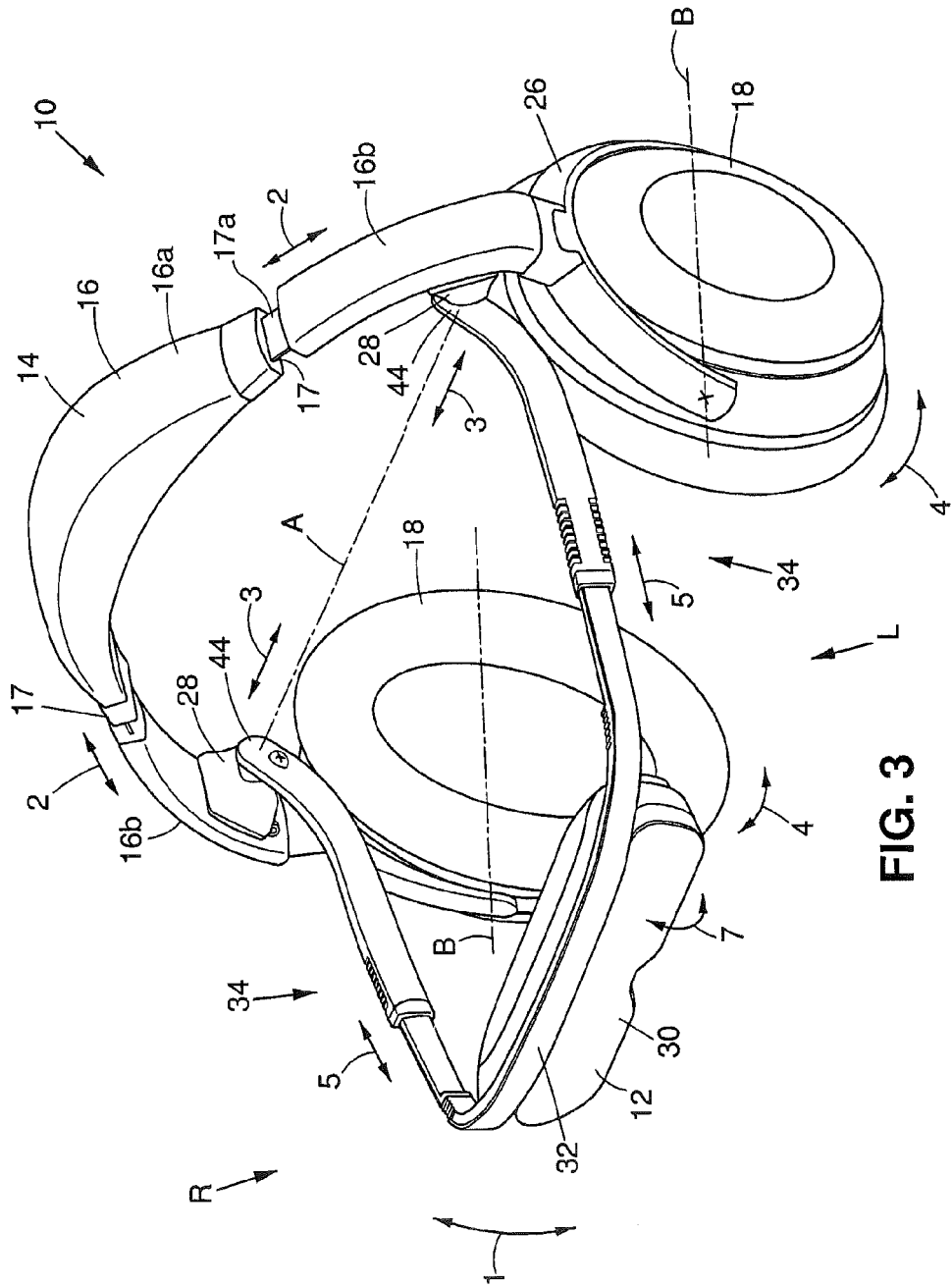
FIG. 3 is a front perspective view of an embodiment of a wearable display apparatus in the present invention.
Figure 4:
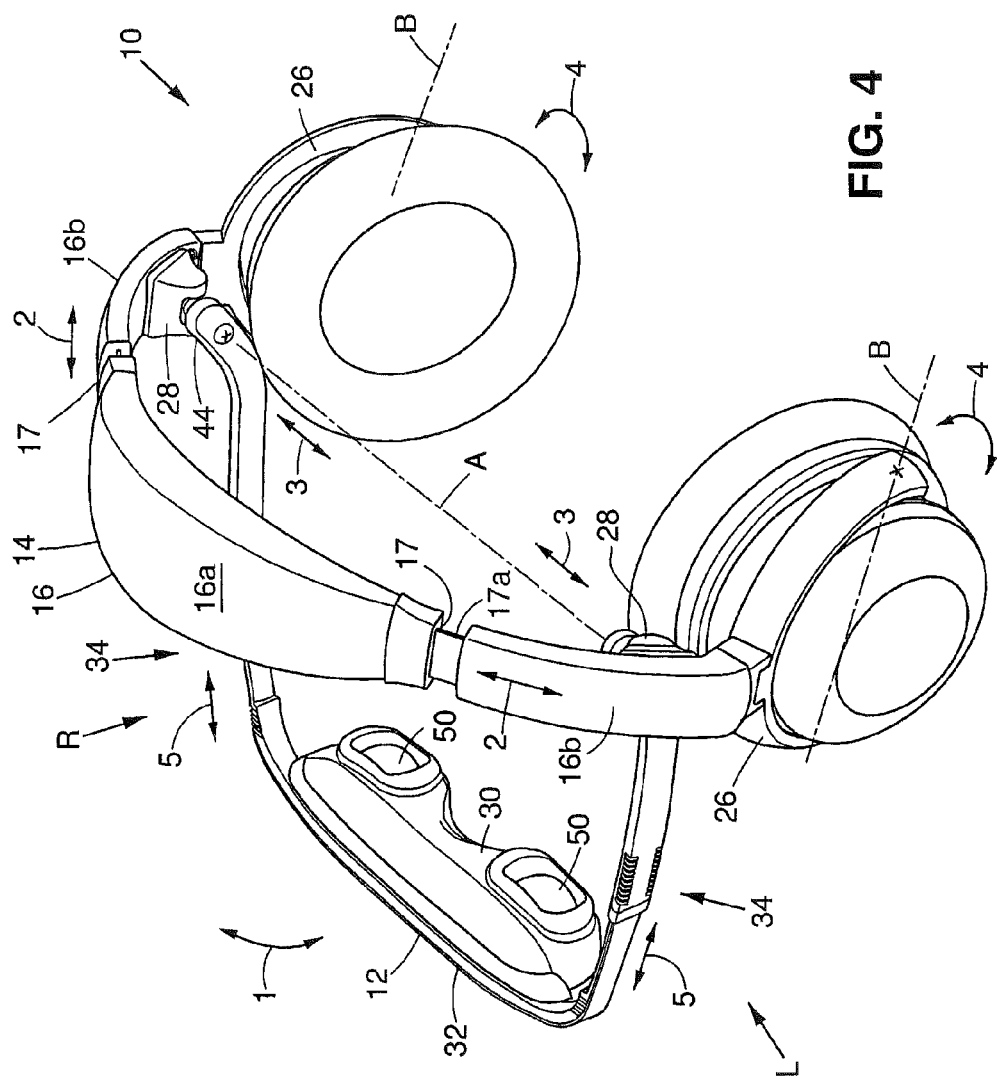
FIG. 4 is a rear perspective view of the wearable display apparatus of FIG. 3.

Referring to FIGS. 3 and 4, the head band 16 can have a curved or arched top or center band member 16*a*, which can be connected on the right side R and left side L to two lower or side band members 16*b* on opposite sides or ends of the center band member 16*a*, each by a sliding joint 17. The sliding joints 17 can have a joint member 17*a* extending between members 16*a* and 16*b*, and allow sliding adjustment in the direction of arrows 2 on each side to increase or decrease the distance between the band members 16*b* relative to the center band member 16*a*. This can allow the earphones 18 of the head set 14 to be adjusted to different head sizes, in height and width. Adjustment in the direction of arrows 2, can be at an angle relative to vertical, which can simultaneously adjust for head height and width. For example, adjustment of the band members 16*b* outwardly or away from center band member 16*a* can adjust the earphones 18 both downwardly relative to center band member 16*a* and further apart from each other in the direction of arrows 3 for a larger head. Adjustment of the band members 16*b* inwardly or towards the center band member 16*a* can adjust the earphones 18 both upwardly relative to the center band member 16 and closer together to each other in the direction of arrows 3 for a smaller head. Each earphone 18 can be rotatably coupled to a side band member 16*b* about a pivot axis B by a lower yoke member 26 connected to the far or distal end of each side band member 16*b*. Pivoting or rotation of the earphones 18 about axis B in the direction of arrows 4 can allow the earphones 18 to adjust rotational position relative to band members 16*b* to fit over the users 24 ears for various adjusted positions of the head band 16. Each axis B can be a generally lateral or a horizontal axis that is transverse to axis A.

The telescoping arms 34 of the telescoping display support assembly 12 can include arm members 36 on the right side R and left side L, from which stem, arm or side portions 32*c* of the support member 32 can telescope with telescoping joints 38. The ends 44 of the arm members 36 and arms 34 can be rotatably connected to the head band 16 to each side band member 16*b* by a three axis joint (pitch, roll and yaw), which can be a ball joint 28. This allows the display support assembly 12 to rotate or pivot about a generally lateral or horizontal rotational axis A extending between ball joints 28, to raise or lower the display support assembly 12 and display 30 in the direction of arrows 1. In addition, the three axis joints or ball joints 28 allow the display support assembly 12 to be pivoted about axis A without binding despite adjustment of the distance between the earphones 18 and the ends 44 of arms 34 in the direction of arrows 3. Such adjustment in the direction of arrows 3 can change the angle at which the ends 44 of the arms 34 of the display support assembly 12 pivot relative to the side band members 16*b*, and the ball joints 28 can have three axes of rotation, pitch, roll and yaw, to compensate for such angle changes to allow pivoting of the display support assembly 12 about axis A without binding.

The arms 34 of the display support assembly 12 on the right side R and the left side L can adjust, slide or telescope in the direction of arrows 5, to increase or decrease the length of the arms 34. This can adjust the display 30 further away or closer to the head band 16, axis A, or the users 24 eyes 25 or face, to adjust to different sized heads, so that the users eyes 25 can be positioned at the proper distance relative to viewing optics 50 for optimal viewing. The display 30 can also be adjusted, moved, pivoted or rotated with a hinge or pivot joint 39 about a tilt, rotational or pivot axis D (FIG. 8) in the direction of arrows 7, to tilt the display 30 and viewing optics 50 relative to the support member 32, arms 34, or the user's 24 eyes 25 or face, to provide further adjustment for viewing (viewing angle). Axis D can be a generally lateral or horizontal axis that can be parallel to axis A.

FIGS. 5-12 depict an embodiment of a display support assembly 12 that can be included in apparatus 10, or if desired, can be attached to other suitable head sets. The display 30 can include an electronic binocular display module 33 (FIG. 12), as is known in the art. The module 33 can include image display panels for generating images, viewing optics 50 for viewing the images, and electronics for the operation of display 30. The module 33 can be enclosed or contained within a housing 31. The housing 31 can have a front housing portion 31*a*, a rear housing portion 31*b*, and upper front housing portion 31*c*, which can be assembled together around module 33 to enclose or contain the module 33.

Figure 12:
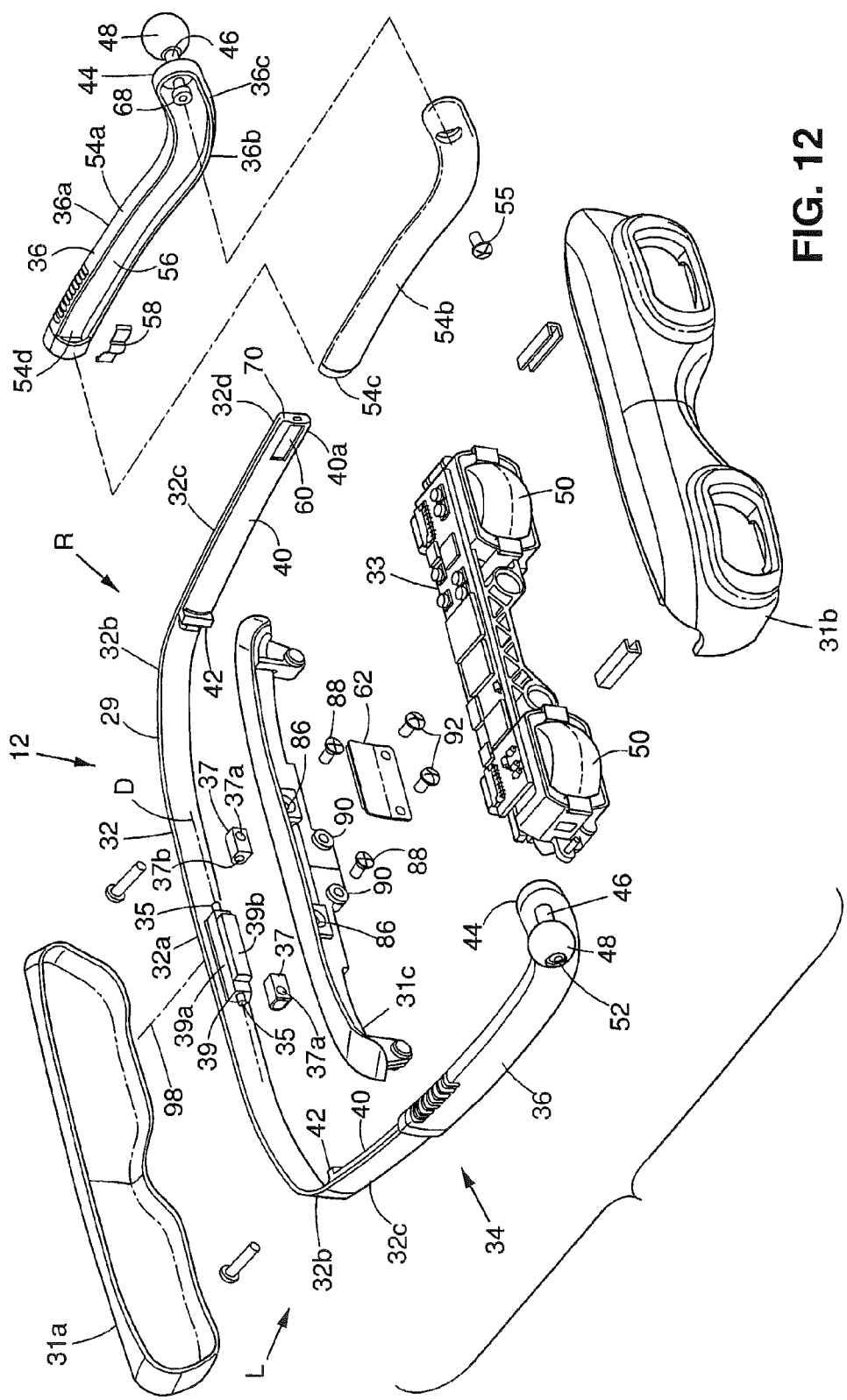
FIG. 12 is an exploded perspective view of the display support assembly of FIG. 5.

The housing 31 can be pivotably connected to the support member 32 of the display support assembly 12 by pivot joint 39 at about the middle or center 98 of a lateral front connecting portion or cross member 32*a* of the support member 32. The pivot joint 39 can include a hinge or pivot member 39*a* mounted to the rear surface 32*e* of the cross member 32*a* of the support member 32, at or about the center 98, and between the two side portions 32*c*. The length of the portion of the cross member 32*a* that is secured to the display 30 can be less than ¼ of the total distance of the cross member 32*a* length that extends between the two side portions 32*c*. The pivot member 39*a* can include two pins, axels or pivots 35 extending from opposite lateral ends of the pivot member 39*a* along axis D on the right side R and left side L. Two mating hinge members 37, each having apertures 37*b* that rotatably engage the pivots 35, can be mounted to housing portion 31*c* of the housing 31, with screws 88 through holes 86 in housing portion 31*c* and holes 37*a* in the hinge members 37 (FIG. 12). The hinge members 37 can be thus constrained, on both sides of the pivot member 39*a*, whereby the hinge members 37 and the housing 31 can pivot about axis D.

Figure 13:
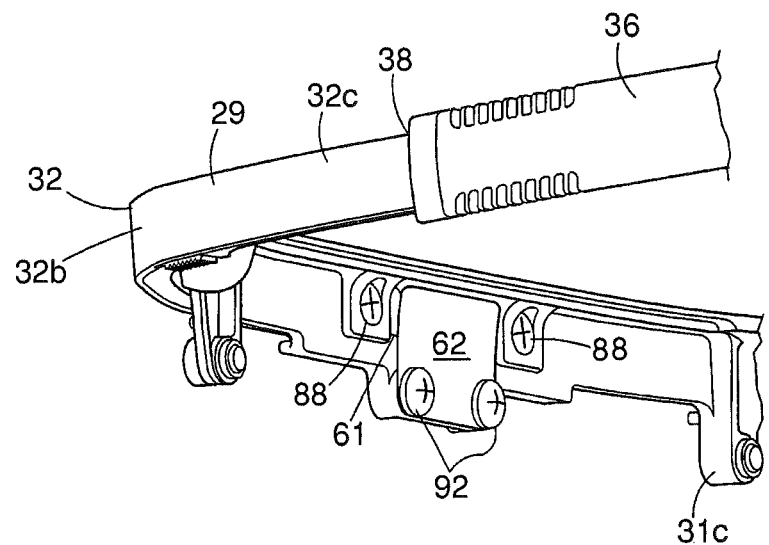
FIG. 13 is a rear perspective view of an embodiment of a pivot joint brake arrangement.
Figure 14:
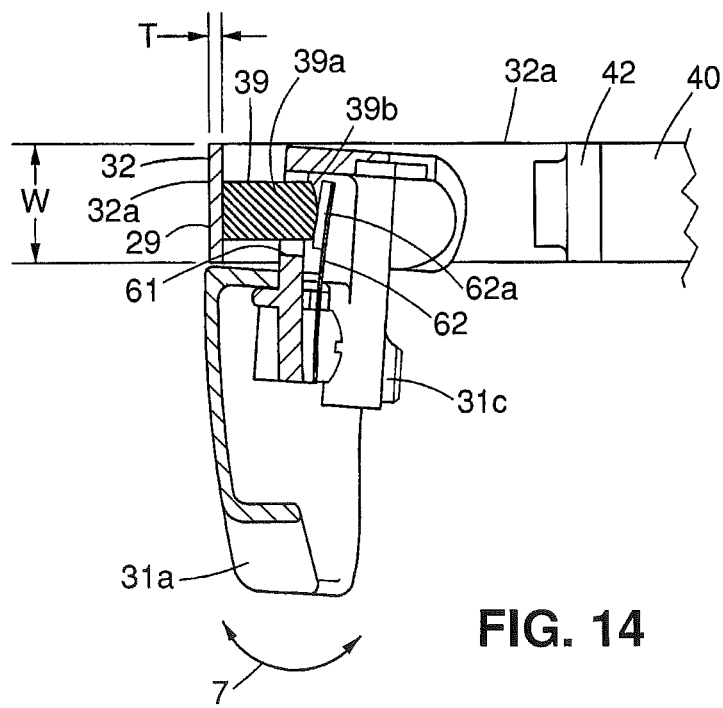
FIG. 14 is a side sectional view of the pivot joint brake arrangement of FIG. 13.

Referring to FIGS. 13 and 14, the hinge member 39*a* can have a frictional cylindrical or curved radius surface or nose 39*b* facing rearwardly towards the display module 33 which can be concentric or generally concentric with the axis D. A frictional resilient or flexible spring plate or brake member 62, can be secured on one side to the housing portion 31*c* of housing 31 with screws 92. The spring plate 62 can be resiliently bent, pressed or biased in a cantilevered manner against the surface 39*b* to provide a preloaded frictional brake surface for pivot joint 39, which can provide frictional resistance during pivoting of the display 30 about axis D. Once the display 30 is tilted or pivoted into the desired adjusted position, the spring plate 62 can provide enough friction against surface 39*b* to keep the display 30 in that adjusted position. The spring plate 62 can engage the curved surface 39*b* while moving in an arc concentrically around axis D so that friction between the spring plate 62 and the surface 39*b* of the pivot member 39*a* can be generally constant and form a constant friction brake. The spring plate 62 can be a spring steel plate and can have a friction pad 62*a*. Other suitable materials can be used for spring plate 62, such as plastics. The curved surface of 39*b* can extend through an opening 61 in the housing portion 31*c* to engage the spring plate 62, which can be mounted to the housing portion 31*c* on the side opposite to the pivot member 39*a*. In some of the figures, (FIGS. 5 and 8), portions of the housing 31 have been omitted to show pivot joint 39.

Figure 5:
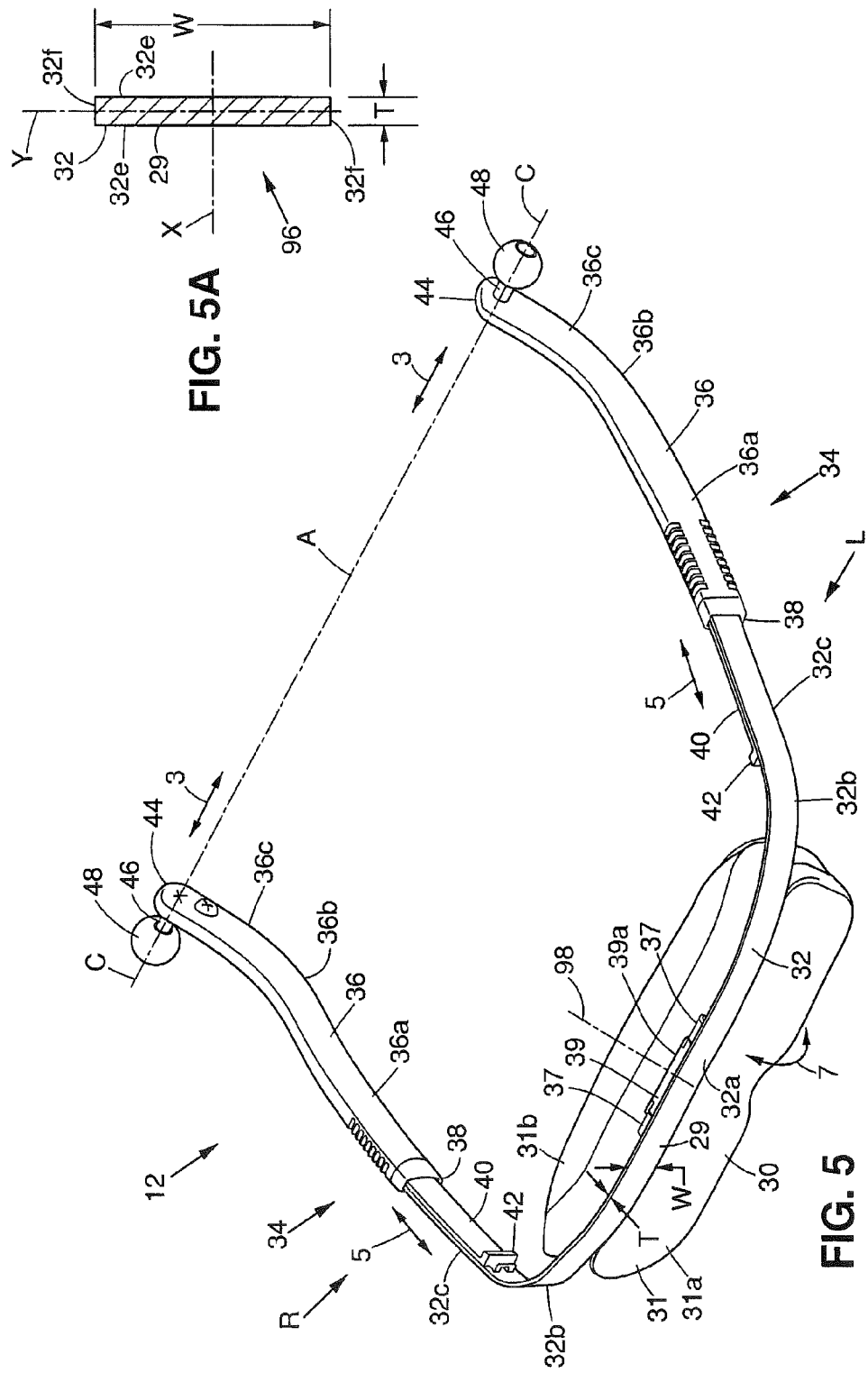
FIG. 5 is a perspective view of an embodiment of a telescoping display support assembly in the present invention.

The support member 32 can be a thin eyewear band with the two side portions 32c bent rearwardly from cross member 32a in cantilevered fashion at curved or bent portions 32b, and into a generally 3 sided yoke shape. The support member 32 can be formed of a unitary thin band or ribbon 29 of material such as metal, polymers, composites or combinations thereof. Steel such as spring steel can be used. The band 29 of material forming the support member 32 can have a constant width W and material thickness T (FIGS. 5 and 5A). The width W of the band 29 can be sized for providing sufficient vertical rigidity along the Y axis of band 29 and support member 32, when upright with edges 32f facing up and down, for supporting display 30 in a generally horizontal cantilevered position for viewing. The thickness T of the band 29 can be made thin enough to provide resilient lateral flexibility or bending, in the direction of the X axis perpendicular or normal to opposed surfaces 32e of width W, to allow the band 29 and support member 32 to laterally bend and adjust or compensate to changes in the arms 34, such as in the lateral distance between arms 34 of the display support assembly 12. This rigidity in one direction along the Y axis, and flexibility along the X axis can be provided by the geometry of the cross section 96 of the band 29 which provides a relatively large area moment of inertia along the Y axis, $$I_y = \frac{TW^3}{12}$$

to provide rigidity, and a relatively low area moment of intertia along the X axis, $$I_x = \frac{WT^3}{12}$$

to provide flexibility. In some embodiments, the band 29 can have a material thickness T of about 0.02-0.06 inches thick, and a width W of about ⅛ to ½ inches, and have a width W to thickness T ratio (W:T) that is about (5-8):1, but can be greater or less, depending upon the material used. As a result, the support member 32 when oriented in the horizontal viewing position of FIG. 1, can have an upright cross section 96 that can be thin laterally (material thickness T of band 29), and have a vertical height that is relatively large (width W of band 29).

Figure 8:
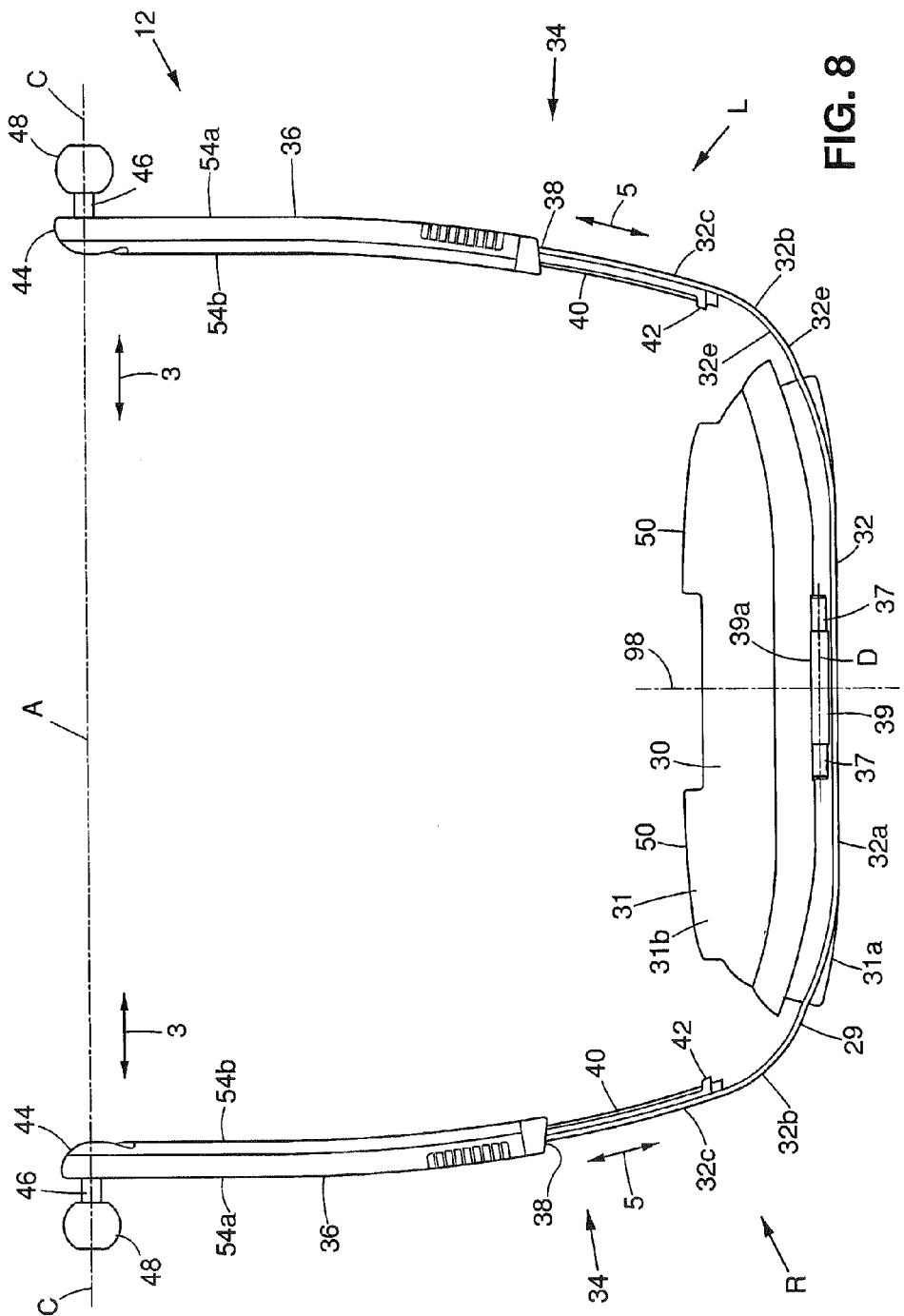
FIG. 8 is a top view of the display support assembly of FIG. 5.

The geometry of the generally three sided yoke shape of the unitary support member 32 and the bent or curved portions 32b can provide additional vertical rigidity to the support member 32 when in a horizontal cantilevered viewing orientation. In addition, since the support member 32 is cantilevered on the two arms 34 by two side portions 32c on the right side R and the left side L, increased strength and/or rigidity can be achieved by distributing the weight of display 30 on two spaced apart side portions 32c. Consequently the geometry of the upright cross section 96 of the band 29, and the geometry of the generally three sided yoke shape of the support member 32, can provide or contribute to vertical stiffness or rigidity for supporting the display 30 in the viewing position, while allowing the support member 32 to bend or flex laterally or normal to the opposed surfaces 32e (FIGS. 8 and 9) for compensating for distance adjustments between arms 34, and self centering of display 30. This can be accomplished while having a simple, elegant, compact and light weight design. Although surfaces 32e can extend along bent portions 32b, as seen in FIG. 5A, surfaces 32e can be considered cross sectionally flat surfaces As seen in FIG. 8, the cross member 32a of the support member 32 can generally extend along the front of the display 30 where the display 30 is mounted to the rear surface 32e. During viewing, this can center the location of the weight P of the display 30 extending down from the center of gravity 100 of the display 30 inward from the front of the cross member 32a (FIGS. 10 and 11) and closer to end 44 of the arm member 36 by a distance $d_p$. Positioning the weight P inward reduces the effect of the weight P on the cantilevered arms 34 and side portions 32c by providing a shorter moment arm relative to the ends 44 of arm members 36, and can minimize the cross sectional size and weight of arms 34 and side portions 32c. In comparison, positioning the display 30 on the outside of the cross member 32a would position the location of the weight P of the display 30 in front of the cross member 32a, creating a larger moment arm relative to the ends 44 of arm members 36, thereby increasing the effect of the weight P on the cantilevered arms 34 and side portions 32c, which can effect the user's 24 comfort as well as require an increased size and weight of arms 34 and side portions 32c.

The bent portions 32b on the right side R and the left side L of the support member 32 can have one or more radii, and can begin a gradual curve or bend rearwardly, starting on opposite sides of the pivot joint 39 close to the pivot joint 39, and then make a sharper curve or bend to form the side portions 32c. The cross member 32a on opposite sides of the pivot joint 39 extends in a cantilevered fashion relative to the pivot joint 39. The display 30 can be secured to the cross member 32a of the support member 32 by the pivot joint 39 along a short length of the cross member 32a at the center 98 so that a majority of the cross member 32a is cantilevered. The side portions 32c extend from the cross member 32a in cantilevered fashion spaced apart from each other, and can extend slightly angled away from each other as shown in FIG. 8. The cross member 32a, bent portions 32b and side portions 32c forming display support 32 can be unitary or formed from a single piece of material. The curved or bent portions 32b can bend and extend around the right side R and the left side L of the display 30. This can allow the support member 32 to have a sufficient length and bend geometry to provide the desired lateral flexibility and self centering characteristics. The distal ends 32d (FIG. 12) of side portions 32c on the right side R and the left side L, can be moveably, slideably, telescopically mounted within a cavity 56 (FIG. 15) in arm members 36, to form sliding or telescoping joints 38, of arms 34. Slide members 40 with slide stops 42 can be mounted to the inner surfaces 32e of side portions 32c and slide within arm members 36. As previously mentioned, adjustment of the head band 16 to different sized heads changes the distance between the earphones 18 in the direction of arrows 3, which also changes the distance between the ends 44 of the arm members 36 of the telescoping arms 34. The lateral flexibility of the support member 32 in the direction along axis X normal to surfaces 32e of width W, allows the arms 34 to bend in and out, towards and away, or relative to each other, to adjust to different width heads, while keeping the display 30 centered and horizontal. The cantilevered portions of the cross member 32a, the curve of the bent portions 32b and the side portions 32c, can extend in a symmetrical manner on opposite sides R and L of the center 98 of the display 30 and cross member 32a (FIGS. 5 and 8), which can allow the side portions 32c of the support member 32 to flex towards or away from each other equally or symmetrically when adjusting to different head widths, while self centering the display 30.

Before assembly with the arm members 36, the bent portions 32b can angle the side portions 32c outwardly further than the position seen in FIGS. 8 and 9, so that when assembled with and constrained by spaced apart arm members 36 and head band 16, the side portions 32c can be bent resiliently inward towards each other and exert a preloaded resilient spring force outwardly away from each other. The constrained resilient bent condition of the support member 32 can provide symmetrical resilient centering of the display 30 with resilient symmetrical bending of the support member 32 in the bent portions 32b on opposite right R and left L sides of the pivot joint 39 and display 30. The support member 32 and band 29 can have a constant thickness T extending between the pivot joint 39 on the center 98 of the cross member 32a and the slide members 40 on the side portions 32c on the right side R and left side L. The width W along the same region can also be constant. This region of the band 29 including bent portions 32b can be bare, with no attached components that might affect the bending or resilient properties of the band 29 extending along bent portions 32b. As a result, the resilient bending properties of the unitary band 29 and support member 32 can start along the bent portions 32b at or near the ends of the pivot joint 39 close to the center 98 of the cross member 32a, along the bent portions 32b and side portions 32c until reaching the slide members 40. This can provide incremental, progressive, or accumulative resilient bending or deflection in a symmetrical manner. As seen in FIG. 8, the arm members 36 can have a slight curve inwardly toward each other, so that the support member 32 can be curved starting along the length of the side portions 32c, and ending close or near to the opposite ends of the pivot joint 39, whereby the display 30 is mounted to the apex of a generally or substantially continuous forward bulging curved support member 32. This can aid symmetrical self centering and adjusting of the support member 32 and the display 30. In some embodiments, the support member 32 can be mounted to the rear of the display 30, or can be formed of two halves on the right side R and left side L that are mounted to the display 30, or to a separate cross member piece.

Figure 15:
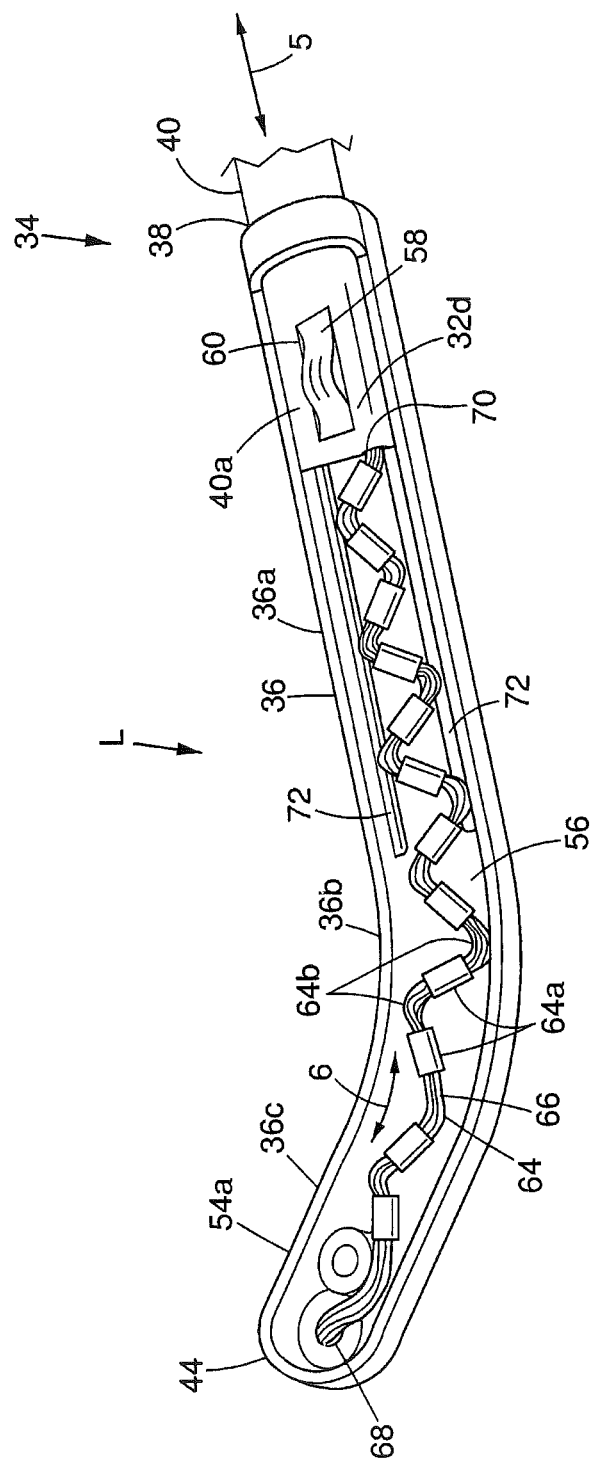
FIG. 15 is a perspective view of the interior of an embodiment of a telescoping arm with an expandable and collapsible cable.

Referring to FIGS. 12 and 15, each arm member 36 on the right side R and left side L can have half portions 54a and 54b which can be secured together by engaging a tongue 54c extending from portion 54b into a recess 54d in portion 54a, and further secured with a fastener such as a screw 55. Each arm member 36 can have a straight portion 36a in which a side portion 32c and slide member 40 slide, a curved, radiused or bent portion 36b, and an upwardly angled portion 36c terminating at end 44. The curved portion 36b and upwardly angled portion 36c can allow the arm members 36 of the display support assembly 12 to be rotatably coupled to the inner sides or inside surfaces of the head band 16. A typical user's 24 eyes 25 are generally horizontally aligned at about the same level with the ears, so that portions of the earphones 18 are typically located at the same general level as the eyes 25. As can be seen in FIGS. 1-4, the curved portion 36b and the upwardly angled portion 36c can position each end 44 of an arm member 36 to a location sufficiently above the earphone 18 to be rotatably coupled by a ball joint 28 on the inside of the head band 16 above each earphone 18. As a result, the display support member 12 can be pivoted upwardly and down into a horizontal position for viewing the display 30 while at the same time having clearance and avoiding interference with the earphones 18. The end 32d of each side portion 32c together with the slide member 40 that is mounted thereto, slide in the passage or cavity 56 of the arm member 36, in the direction of arrows 5. The end 40a of the slide member 40 can have a spring member 58 positioned in a recess 60 of the slide member 40. The spring member 58 can resiliently laterally engage or press against an interior lateral surface of half portion 54b of arm 36 to provide sufficient friction such that the sliding or telescoping joint 38 can remain in position when adjusted. The slide members 40 can have an inward curve to match the curve of the arm members 36 as seen in FIG. 8, to facilitate sliding. The cavity 56 can include rails 72 to further promote sliding of the telescoping joint 38.

Figure 16:
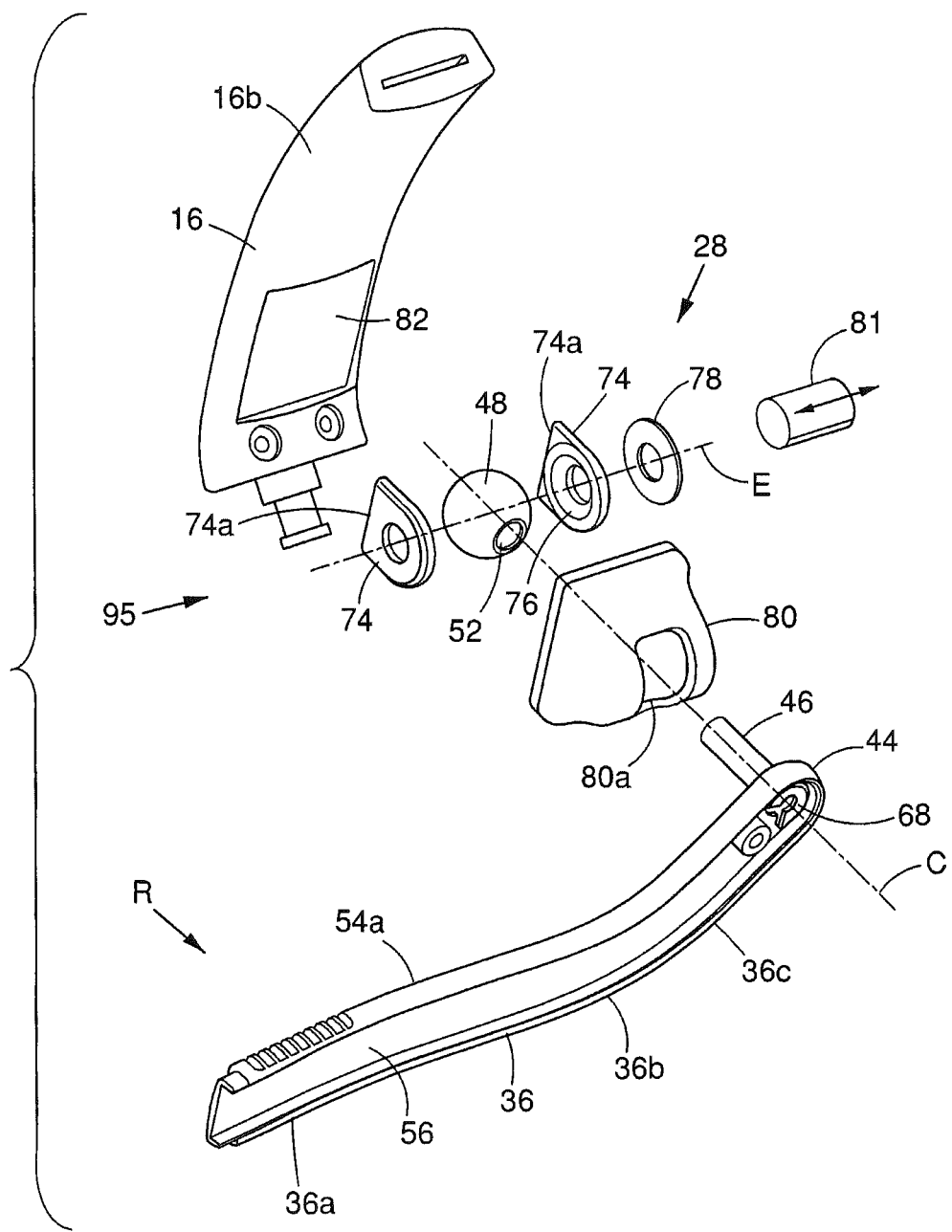
FIG. 16 is an exploded view of an embodiment of a ball joint assembly.
Figure 17:
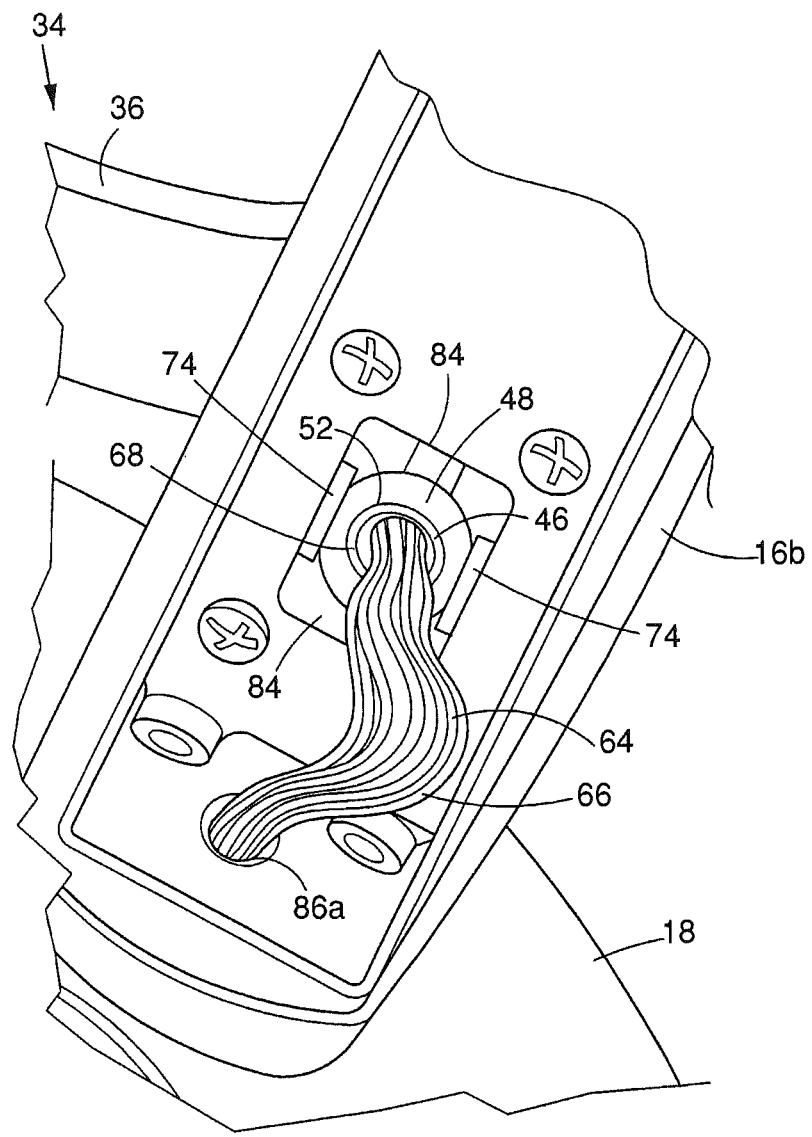
FIG. 17 depicts an embodiment of a ball joint through which electrical wires extend.

Electrical power and/or communication signals can be provided to the display 30 through the telescoping arms 34 by an electrical cable 64 extending within the cavity 56 of one or both arm members 36 (FIG. 15). In one embodiment, the cable 64 can extend from an earphone 18 through opening 86a into head band member 16b, and can enter the cavity 56 of the arm member 36 at end 44 through openings 52 and 68 of ball 48 and stem 46 of ball joint 28 (FIGS. 16 and 17). The cable 64 extends within the cavity 56 and can be secured to the end 40a of the slide member 40. The cable 64 can extend longitudinally through the slide member 40 through an opening 70 starting at the end 40a.

The cable 64 can include a series of individual wires 66, and can be in the form of a flexible wire harness which can expand and compress in the direction of arrows 6 to accommodate telescoping of sliding of the slide member 40 and side portion 32c within the cavity 56. The wires 66 can include or be a series of Litz wires, each being individually insulated with an insulative coating, and having a small diameter, for example 33 gauge. The Litz wires 66 can be bundled with spaced apart jackets, coats or tubes 64a, which can be formed of insulative material, such as short sections of over molded insulation or heat-shrink tubing. This can form a cable 64, wire harness or assembly, having a series of short insulative stiff or rigid regions, sections, links or members, formed by the jackets 64a wrapping around the wires 66, which are separated by foldable, flexible or bendable gaps, regions, sections or joints 64b, formed by the regions, lengths or areas of bare Litz wires extending between the jackets 64a. The links can be arranged or bent back and forth in zig zag or alternating fashion. In one embodiment, the jackets 64a can be about 4 mm long and the gaps 64b between the jackets can be about 3 mm. Having intermittent stiff sections and predetermined bendable or flexible sections, regions or joints can allow the cable 64 or wire harness to expand and contract in a predictable folding manner, such as in an accordion or concertina manner. The multiple bare Litz wire regions between the jackets 64b can be very flexible and can allow for a small bend radius to make folding accomplished in a compact manner. When folded or collapsed, the outer surfaces of adjacent jackets 64a of the cable 64 or wire harness can abut against each other, and the thicknesses of the jackets 64a can form a stop defining a minimum bend radius so that the Litz wires cannot be bent at a smaller or sharper radius which could damage the Litz wires. With the end 44 of the arm member 36 being curved upwardly, this configuration of the wire harness can easily be pushed into and collapsed, or pulled from and expanded within the curved cavity 56 of an arm member 36 without binding. In some embodiments, the arm members 36 can curve downwardly or can be generally straight. In other embodiments, a flat flex cable can be used, which can be bent back and forth in an alternating fashion to expand and contract.

Referring to FIGS. 16 and 17 each ball joint 28 on the right side R and left side L can be in a ball joint assembly 95, and can include a ball 48 mounted to a stem 46 extending laterally or perpendicularly outwardly from an arm member 36 at end 44. The ball 48 can be secured or retained on the stem 46 along an axis C with a press fit through opening 52. The ball 48 can engage two opposed socket halves 74 having contoured mating surfaces 76 which can be retained or enclosed within a frame or enclosure 80 to side head band member 16b at region 82. The socket halves 74 can together form a socket between or within which the ball 48 can be constrained and pivoted or rotated. The ball 48 can rotate within the socket halves 74 about 3 axes, pitch, roll and yaw, and can adjust for tilting or changes in angle of axis C, such as when head set 14 is adjusted. The socket halves 74 can be shaped or configured such as with a flat edge surface 74a, to engage a surface while enclosed within enclosure 80 and prevent rotation of the socket halves 74. Enclosure 80 can have an opening 80a having a sufficient size to allow tilting of stem 46 with changing distance between arm members 34. The socket halves 74 can be positioned on an axis E on opposite sides of ball 48, which can be transverse to axis C. A spring member 78 such as a wave spring washer, or a belleville spring washer can be positioned on axis E against the outer surface or side of one socket half 74, and can resiliently bias the socket halves 74 against the ball 48 from opposite sides to provide friction to retain the ball 48 and ball joint 28 in a fixed position once the display support assembly 12 is adjusted to the desired position. The spring member 78 can provide an adjustable spring preload exerted on the ball 48 to control friction of the ball joint 28. An adjustable member 81 can be moved to adjust the tension of the spring member 78, for example in the axial direction.

As seen in FIGS. 1-4, the display support assembly 12 can be rotatably mounted by ball joints 28 to the head band 16 to opposing inner sides of the head band members 16b of the head band 16, and facing each other. As a result, the size of the display support assembly 12, such as the width, can be made smaller and lighter than if the display support assembly 12 were rotatably mounted to the outside surfaces of the head band 16. The smaller size of the display support assembly 12 can allow the support member 32 to be made of a thin light weight resilient flexible band 29 which can provide resilient flexible self centering adjustment for different adjustable distances between the telescoping arms 34 while also providing support for the display 30, thereby making the display support assembly 12 light weight. Referring to FIGS. 8 and 9, the arm members 36 can curve slightly towards each other, moving towards the front, or facing display 30. This can further decrease the width or size of support member 32. Referring to FIGS. 5-9, axes C are shown to be aligned with the axis A, about which the display support assembly 12 rotates relative to the head band 16. It is understood that as the arms 34 are adjusted inwardly or outwardly in the directions of arrows 3, that the axes C can become skewed or angled relative to axis A. The ball 48 is able to rotate within the socket halves 74, while axes C are skewed relative to axis A or where the angle of rotation of the joint has changed, without binding, and therefore can compensate for distance adjustments between arms 34.

While this invention has been particularly shown and described with references to example embodiments thereof, it will be understood by those skilled in the art that various changes in form and details may be made therein without departing from the scope of the invention encompassed by the appended claims.

For example, although display 30 has been described as a binocular display, it is understood that in some embodiments, display can be a monocular display that is positioned for viewing by one eye. Terms such as up, down, lateral, side, horizontal, front, rear, etc. have been used to describe embodiments of the present invention when positioned in a particular orientation. It is understood that the orientation of embodiments and certain components can differ or be changed.

What is claimed is:

1. A wearable display apparatus comprising:
   an upright head band having a curved top and lower right and left sides for wearing over and on a user's head;
   right and left side earphones, each coupled to a respective lower right and left side of the headband;
   a display for providing viewable images; and
   a display support assembly that supports the display, the display support assembly for adjusting position of the display for viewing by the user, the display support assembly comprising,
   right side and left side arm members spaced apart from each other, and a unitary laterally flexible resilient support member to which the display is mounted between the arm members, the support member having a cross member between right and left side portions which are capable of laterally bending towards and away from each other to adjust to head size, the display being mounted to the cross member by a pivot joint for pivotal adjustment of the display relative to the cross member, the arm members of the display support assembly being rotatably mounted to opposing inner sides of the head band with two opposing joints of a display support assembly joint arrangement that are positioned over respective earphones and face each other, about a generally lateral display support assembly pivot axis that is centered and spaced above each earphone, for pivotably raising and lowering the display support assembly, each arm member having a straight portion to which a respective side portion of the support member is mounted, a curved portion extending from the straight portion, and into an upwardly angled portion extending over a respective earphone having an end with a joint member for engaging a respective display support assembly joint on an inner side of the head band spaced above a respective earphone for providing up and down pivoting arm member clearance over the earphone inwardly from said inner side of the head band, when the display support assembly is in a down position, the upwardly angled portion extends upwardly toward said end above and over a respective earphone, the joint members of the arm members each being connected to a respective frame extending inwardly from respective lower sides of the head band that inwardly space the arm members apart from the inner sides of the lower sides of the head band.

2. The apparatus of claim 1 in which the unitary support member comprises a resilient metallic band in which the side portions of the unitary support member are bent relative to the cross member in a radius where the side portions are angled slightly away from each other.

3. The apparatus of claim 2 in which the side portions of the unitary support member telescopically slide within a cavity in each arm member.

4. The apparatus of claim 1 in which the side portions of the support member are provided with a preloaded resilient spring force outwardly away from each other that is constrained between the arm members.

5. The apparatus of claim 4 in which a constrained resilient bent condition of the support member provides symmetrical resilient centering of the display.

6. The apparatus of claim 3 further comprising a cable extending within at least one arm member for providing electrical communication to the display, the cable being secured to a respective telescoping side portion of the support member within the at least one arm member, the cable having a pattern of predetermined bendable and unbendable regions to allow a length of the cable to contract and expand in a predictable manner with telescoping of the side portion.

7. The apparatus of claim 6 in which the cable has a series of generally rigid sections separated from each other with generally flexible sections, at least a portion of the cable being positioned in a zig-zag fashion to allow contraction and expansion of the cable in an accordion like manner.

8. The apparatus of claim 6 in which the cable includes a series of individually insulated Litz wires with a length over which a series of generally rigid insulative sections are formed that are separated from each other by gaps, to form the bendable and unbendable regions.

9. The apparatus of claim 1 in which the arm members of the display support assembly are rotatably mounted to the head band with the joint arrangement to allow pivoting of the display support assembly up and down and having an angle of rotation that moves to compensate for varying distances between the arm members.

10. The apparatus of claim 9 in which the joint arrangement comprises two ball joints.

11. The apparatus of claim 1 in which the display is mounted to the support member by the pivot joint about a pivot axis, the pivot joint having a radius surface generally concentric to the pivot axis that contacts a resilient biased plate member to provide a frictional brake to hold the display in place once pivoted to a desired position.

12. A wearable display apparatus comprising:
an upright head band having a curved top and lower right and left sides for wearing over and on a user's head;
right and left side earphones, each coupled to a respective lower right and left side of the headband;
a display for providing viewable images; and
a display support assembly that supports the display for adjusting position of the display for viewing by the user, the display support assembly comprising,
right and left side arm members spaced apart from each other, and a unitary laterally flexible resilient support member to which the display is mounted between the arm members, the support member having a cross member between right and left side portions which are capable of laterally bending towards and away from each other to adjust to head size, the display being mounted to the cross member by a pivot joint for pivotal adjustment of the display relative to the cross member, the side portions of the support member having a preloaded resilient spring force outwardly away from each other that is constrained between the arm members, the arm members of the display support assembly being rotatably mounted to opposing inner sides of the head band by two opposing joints of a display support assembly joint arrangement that are positioned over respective earphones and face each other, about a generally lateral display support assembly pivot axis that is centered and spaced above each earphone for pivotably raising and lowering the display support assembly, and having an angle of rotation that moves to compensate for varying distances between the arm members, each arm member having a straight portion to which a respective side portion of the support member is mounted, a curved portion extending from the straight portion, and into an upwardly angled portion extending over a respective earphone having an end with a joint member for engaging a respective display support assembly joint on an inner side of the head band spaced above a respective earphone for providing up and down pivoting arm member clearance over the earphone inwardly from said inner side of the head band, when the display support assembly is in a down position, the upwardly angled portion extends upwardly toward said end above and over a respective earphone, the joint members of the arm members each being connected to a respective frame extending inwardly from respective lower sides of the head band that inwardly space the arm members apart from the inner sides of the lower sides of the head band.

13. A method of using a wearable display apparatus comprising:
providing the wearable display apparatus with an upright head band having a curved top and lower right and left sides for wearing over and on a user's head, right and left side earphones, each coupled to a respective lower right and left side of the headband, a display for providing viewable images, and a display support assembly that supports the display, the display support assembly for adjusting position of the display for viewing by the user, the display support assembly comprising,
right side and left side arm members spaced apart from each other, and a unitary laterally flexible resilient support member to which the display is mounted between the arm members, the support member having a cross member between right and left side portions, the display being mounted to the cross member by a pivot joint, the arm members of the display support assembly being rotatably mounted to opposing inner sides of the head band with two opposing joints of a display support assembly joint arrangement that are positioned over respective earphones and face each other, about a generally lateral display support assembly pivot axis that is centered and spaced above each earphone;
laterally bending the right and left side portions of the laterally flexible resilient support member towards and away from each other to adjust to head size;
pivotably adjusting the display relative to the cross member with the pivot joint that mounts the display to the cross member; and
pivotably raising and lowering the display support assembly relative to the head band with the joint arrangement that rotatably mounts the arm members of the display support assembly to the opposing inner sides of the head band, each arm member having a straight portion to which a respective side portion of the support member is mounted, a curved portion extending from the straight portion, and into an upwardly angled portion extending over a respective earphone having an end with a joint member for engaging a respective display support assembly joint on an inner side of the head band spaced above a respective earphone for providing up and down pivoting arm member clearance over the earphone inwardly from said inner side of the head band, when the display support assembly is in a down position, the upwardly angled portion extends upwardly toward said end above and over a respective earphone, the joint members of the arm members each being connected to a respective frame extending inwardly from respective lower sides of the head band that inwardly space the arm members apart from the inner sides of the lower sides of the head band.

14. The method of claim 13 further comprising providing the unitary support member with a resilient metallic band in which the side portions of the unitary support member are bent relative to the cross member in a radius where the side portions are angled slightly away from each other.

15. The method of claim 14 further comprising telescopically sliding the side portions of the unitary support member within a cavity in each arm member.

16. The method of claim 13 further comprising providing the side portions of the support member with a preloaded resilient spring force outwardly away from each other that is constrained between the arm members.

17. The method of claim 16 further comprising providing symmetrical resilient centering of the display with a constrained resilient bent condition of the support member.

18. The method of claim 15 further comprising extending a cable within at least one arm member for providing electrical communication to the display, the cable being secured to a respective telescoping side portion of the support member within the at least one arm member, the cable having a pattern of predetermined bendable and unbendable regions to allow a length of the cable to contract and expand in a predictable manner with telescoping of the side portion.

19. The method of claim 18 further comprising providing the cable with a series of generally rigid sections separated from each other with generally flexible sections, at least a portion of the cable being positioned in a zig-zag fashion to allow contraction and expansion of the cable in an accordion like manner.

20. The method of claim 18 further comprising providing the cable with a series of individually insulated Litz wires with a length over which a series of generally rigid insulative sections are formed that are separated from each other by gaps, to form the bendable and unbendable regions.

21. The method of claim 13 further comprising rotatably mounting the arm members of the display support assembly to the head band with the joint arrangement to allow pivoting of the display support assembly up and down while having an angle of rotation that moves to compensate for varying distances between the arm members.

22. The method of claim 21 further comprising providing the joint arrangement with two ball joints.

23. The method of claim 13 further comprising mounting the display to the support member with the pivot joint about a pivot axis, the pivot joint having a radius surface generally concentric to the pivot axis that contacts a resilient biased plate member to provide a frictional brake to hold the display in place once pivoted to a desired position.

24. A method of using a wearable display apparatus comprising:

providing the wearable display apparatus with an upright head band having a curved top and lower right and left sides for wearing over and on a user's head, right and left side earphones, each coupled to a respective lower right and left side of the headband, a display for providing viewable images, and a display support assembly that supports the display for adjusting position of the display for viewing by the user, the display support assembly comprising, right and left side arm members spaced apart from each other, and a unitary laterally flexible resilient support member to which the display is mounted between the arm members, the support member having a cross member between right and left side portions, the display being mounted to the cross member by a pivot joint, the side portions of the support member having a preloaded resilient spring force outwardly away from each other that is constrained between the arm members, the arm members of the display support assembly being rotatably mounted to opposing inner sides of the head band by two opposing joints of a display support assembly joint arrangement that are positioned over respective earphones and face each other, about a generally lateral display support assembly pivot axis that is centered and spaced above each earphone and having an angle of rotation that moves to compensate for varying distances between the arm members;

laterally bending the right and left side portions of the laterally flexible resilient support member towards and away from each other to adjust to head size;

pivotably adjusting the display relative to the cross member with the pivot joint that mounts the display to the cross member; and pivotably raising and lowering the display support assembly relative to the head band with the joint arrangement that rotatably mounts the arm members of the display support assembly to the opposing inner sides of the head band, while compensating for varying distances between the arm members due to varying head sizes with a moving angle of rotation, each arm member having a straight portion to which a respective side portion of the support member is mounted, a curved portion extending from the straight portion, and into an upwardly angled portion extending over a respective earphone having an end with a joint member for engaging a respective display support assembly joint on an inner side of the head band spaced above a respective earphone for providing up and down pivoting arm member clearance over the earphone inwardly from said inner side of the head band, when the display support assembly is in a down position, the upwardly angled portion extends upwardly toward said end above and over a respective earphone, the joint members of the arm members each being connected to a respective frame extending inwardly from respective lower sides of the head band that inwardly space the arm members apart from the inner sides of the lower sides of the head band.

* * * * *